Dec. 14, 1965　　　A. J. YERMAN　　　3,223,795
BRAKE LINING SIGNAL SWITCH
Filed Feb. 17, 1964

ARNOLD J. YERMAN
INVENTOR.

BY Earl E. Moore
Atty.

United States Patent Office 3,223,795
Patented Dec. 14, 1965

3,223,795
BRAKE LINING SIGNAL SWITCH
Arnold J. Yerman, 9459 Kaiser St., Fontana, Calif.
Filed Feb. 17, 1964, Ser. No. 345,412
1 Claim. (Cl. 200—61.4)

This invention is for means and ways to warn a motorist when the brake lining of his automobile is thin and needs replacement. The invention is not limited to just automobiles, for it is within the concepts of this invention that the invention may be used on any type of mechanism that employs brake lining to bring a moving part to rest or to slow down a moving part.

So far as known, no means is available to warn a motorist about the condition of the brake lining at the wheels of his car. Careful inspection is the general manner for determining the thinness of the brake lining and whether or not to reline the brakes. This requires time and generally a charge for services.

In this invention, means are provided to warn the motorist when the brake lining is thin and the warning is accomplished by a flashing red light upon the control board or the dashboard of the car. When such a light flashes, the lining is thin, but, however, there is sufficient time yet available to make necessary arrangements to have the brakes relined which may a few weeks or so.

One of the principal objects of this invention is to present a new and novel means to give a motorist timely warning that the brake lining on his automobile, or other kinds of machinery, needs replacement.

Another object is to provide electrical means at the brake lining of a vehicle which makes switch contact with a rotary drum, when the lining is thin, and which is operative to close an electrical circuit that flashes a red light or other suitable signal upon the dashboard of the vehicle or a control board when the invention is applied to some other type of machinery.

Other objects will become apparent upon the perusal of the appended specification and claims.

In the drawings:

FIG. 1 is a vertical view of the rear brake assembly or housing of a typical braking device of a vehicle or the like;

Figure 1:
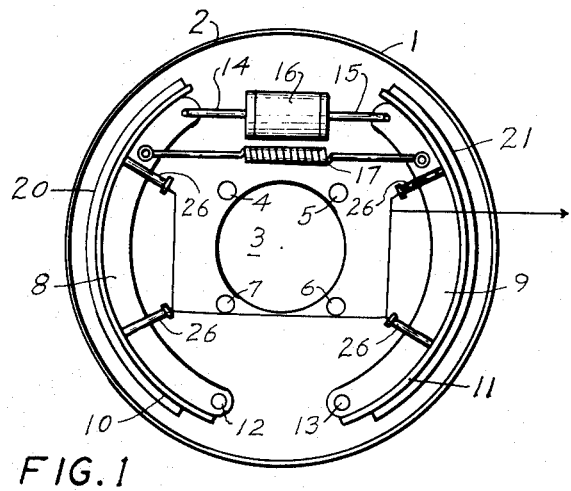
Figure 2:
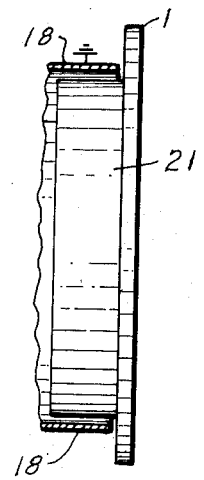
FIG. 2 is a side elevational view of that shown in FIG. 1; but this figure also shows a portion of a typical brake drum.

As shown in the drawings, the numeral 1 indicates the rim of a main support pan, plate or rack 2 having the relatively large central opening 3 which is designed to surround the axle assembly, not shown; this plate is bolted in a well known manner to the flange of the axle housing. Numerals 4, 5, 6 and 7 show the bolt holes. The brake shoes are at 8 and 9 and these shoes have their respective outstanding flanges 10 and 11. These parts are resiliently balanced upon the plate 2 so that they can be expanded and contracted in a well known manner.

Each shoe is pivoted upon its respective pin 12 or 13 which are fixed to the plate 2. The upper ends of the shoes have; the pivoted rods 14 and 15 that enter into the brake operating cylinder 16. This cylinder receives pressure fluid which forces the piston heads of the rods 14 and 15 within the cylinder apart or outwardly to expand the shoes when the brake pedal of the automobile is pressed. The brake fluid enters into the cylinder through a rear opening, not shown. A heavy tension spring 17 has its ends connected to the shoe parts 8 and 9 so that the shoes contract away from the drum 18 when the brake fluid pressure is released. The operation of the brake and various parts of the brake equipment are not shown nor explained for the reason that the particular brake means itself is not necessarily a part of this invention. This invention is applicable to most any type of rotary braking device and may have use in non-rotary kinds of braking mechanism also. The above recited parts are common to most automobiles and are used herein so as to clearly disclose the invention.

Figure 3:
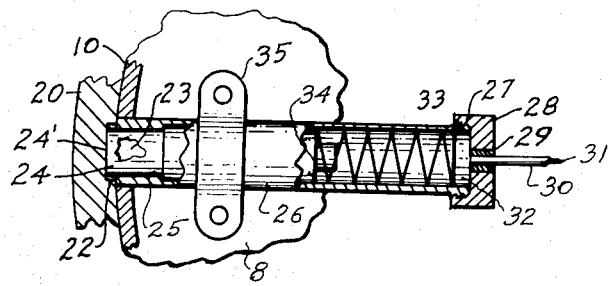
FIG. 3 is an enlarged view, partly in section and partly in elevation, of switch contact means employed in the invention.

Each shoe has its respective brake lining 20 and 21 and these linings are either riveted or cemented to their respective shoe. Each lining has one or more spaced apart cavities or recesses like 22 in FIG. 3. For each recess there is an electrical conductor or carbon brush member 23 coated with a water-proof insulation material 24 which may be any suitable substance such as a plastic, "Bakelite" or a baked clay. This brush or contact conductor 23, and its coating, has the annular shoulder portion 25 that abuts a similar annular shoulder in the metal casing 26 so that the brush or contact conductor 23 extends but a limited distance into the recess so as to not form a bulge in the lining and thus be detrimental to the objects of this invention.

The casing 26 is brazed or welded to the metal shoe 10 and the distal end thereof, the casing, is provided with a threaded portion 27 that receives the internally threaded cap 28. This makes a good water-proof seal. The cap has the opening 29 that is filled with a sealing compound and which compound is formed around the insulated covering 30 of the electrical wire or conductor 31. This conductor is integral with a copper contact element 32 within the casing and which makes electrical connection with one end of the coiled metal conductor expansion spring 33. This spring is attached to the top reduced portion 34 of the contact conductor or brush 23 so that there is good electrical connection all the way from the wire 31 to the inner end or lining toward end of the brush 23. A pipe strap 35 is used to firmly hold the casing 26 of the switch unit to the shoe portion 8.

Whenever the lining 20 wears down to the end 24' of the brush, the insulating coating 24 is worn away and then electrical contact is made between the brush 23 and the grounded drum 18 of the brake means. This is a switching action for closing a circuit and thus can turn on a flashing light upon the dashboard of the automobile whenever the brake is applied.

Figure 4:
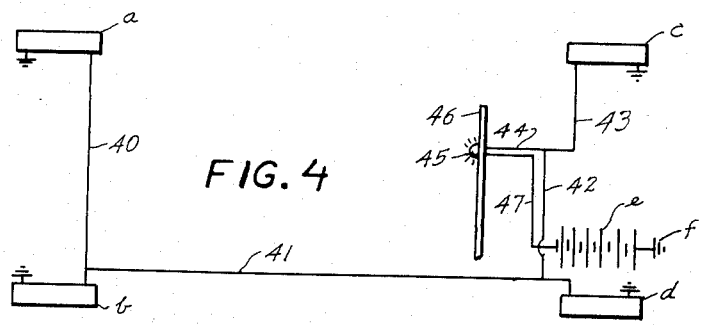
FIG. 4 is a schematic view showing the electrical circuit etc.

FIG. 4 shows a circuit connecting the brushes of the four brake units a, b, c and d in parallel with a warning light means. The insulated conductor 40 connects the brushes in units a and b and conductor 41 connects conductor 40 with the brushes in d with conductor 42. This conductor 42 makes connection with conductor 43 that is in connection with the brushes in unit c and also connects with the conductor 44 that leads to the light bulb in the flasher device 45 which is mounted upon the dashboard indicated at 46. The other side of the bulb in the flasher device 45 is connected to the conductor 47 that makes connection with one side of the automobile battery e. The other side of the battery is grounded to the frame of the automobile at f. Note, that each brake unit is grounded to the car frame so that a complete circuit can be effected. It should now be clear, that when the brush element 23 makes electrical contact with the drum of the wheel, the electric bulb in device 45 will shine or flash in a red colored warning signal, and this will happen only when the brake of the car is applied.

Certain new and novel details of a brake lining warning system are disclosed herein and to some extent in considerable detail for the purposes of making the invention clear in at least one form or application thereof. But, it is to be clearly understood that the disclosure herein is not necessarily limited to the exact form, means and ways as shown since it is probable that many modifications and changes may be made to that herein disclosed without materially departing from the spirit and scope of the claims as herein set forth.

Having thus described my invention, what is claimed as new and desired to be secured by Letters Patent is:

A signalling device for the brake units of vehicles and machinery; a shiftable brake shoe means, a rotary brake drum for contacting the shoe means, a casing with a shoulder therein attached to the shoe means, a lining on the shoe means, an electrical conductor brush in the casing having a portion extending to the lining, a conductor wire in electrical connection with the brush, means attached to the wire for operating a signal when the lining wears thin enough for the brush to make contact with the brake drum, the brush having an offset means engaging the said shoulder to limit its motion toward the drum, and a conductor spring means in the casing constantly urging the brush toward the lining, the brush having a tough thin coating of insulating material except where the spring makes contact therewith to prevent the brush having electrical contact with the casing, lining, and the drum until the drum wears the coating to expose the brush for electrical contact with the drum.

References Cited by the Examiner
UNITED STATES PATENTS

| | | | |
|---|---|---|---|
| 2,146,357 | 2/1939 | Schweikle | 200—61 |
| 2,217,176 | 10/1940 | Madison | 200—61 |
| 2,636,090 | 4/1953 | Branschofsky | 200—61 |
| 2,731,619 | 1/1956 | Fratus | 200—61 |
| 2,814,684 | 11/1957 | De Pascale | 200—61 |
| 2,835,757 | 5/1958 | Chellemi et al. | 200—61 |

ROBERT K. SCHAEFER, *Acting Primary Examiner.*

BERNARD A. GILHEANY, *Examiner.*